US011129065B2

(12) United States Patent
Lin et al.

(10) Patent No.: US 11,129,065 B2
(45) Date of Patent: Sep. 21, 2021

(54) DATA TRANSMISSION OPTIMIZATION IN WIRELESS NETWORK WHERE TERMINAL MOVES ALONG TRACK ROUTE

(71) Applicant: HUAWEI TECHNOLOGIES CO., LTD., Shenzhen (CN)

(72) Inventors: Nizhong Lin, Shanghai (CN); Lingli Pang, Shanghai (CN); Xiaoxiao Zheng, Shanghai (CN); Guoqiong Cao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 16/564,002

(22) Filed: Sep. 9, 2019

(65) Prior Publication Data

US 2020/0008111 A1 Jan. 2, 2020

Related U.S. Application Data

(63) Continuation of application No. PCT/CN2017/076344, filed on Mar. 10, 2017.

(51) Int. Cl.
*H04W 36/00* (2009.01)
*H04L 12/761* (2013.01)
(Continued)

(52) U.S. Cl.
CPC ......... *H04W 36/0055* (2013.01); *H04L 45/16* (2013.01); *H04W 24/02* (2013.01);
(Continued)

(58) Field of Classification Search
CPC ..... H04W 28/16; H04W 36/32; H04W 4/029; H04W 72/1236; H04W 28/0226;
(Continued)

(56) References Cited

U.S. PATENT DOCUMENTS 9,159,085 B2 10/2015 Singh
2004/0063448 A1* 4/2004 Hayashi ............... H04W 28/22
455/500

(Continued)

FOREIGN PATENT DOCUMENTS

CN 1722883 A 1/2006
CN 102118754 A 7/2011
(Continued)

OTHER PUBLICATIONS

Samsung, "Support of time domain ICIC in Rel-10", 3GPP TSG RAN WG1 Meeting #62bis, R1-105406, Oct. 11-15, 2010, total 4 pages, Agenda item:6.8.1.1, Xian, China.

(Continued)

*Primary Examiner* — Ian N Moore
*Assistant Examiner* — Sun Jong Kim
(74) *Attorney, Agent, or Firm* — Maier & Maier, PLLC

(57) ABSTRACT

A data transmission optimization method, a terminal, and a network device are provided. The terminal determines to move along a track route included in a track context and reach a to-be-optimized route segment on the track route, where the track context is pre-generated by the terminal, and includes a track route along which the terminal moves and that is passed through by the terminal in a historical time and a to-be-optimized route segment on the track route, a value of a predefined measurement parameter meets a preset threshold value range when the terminal moves in the to-be-optimized route segment. The terminal sends a data transmission optimization instruction to a network device, where the data transmission optimization instruction is used to instruct the network device to perform a data transmission optimization processing operation, and the data transmission optimization processing operation includes adjusting a resource allocation policy of the terminal.

15 Claims, 5 Drawing Sheets

(51) Int. Cl.
*H04W 24/02* (2009.01)
*H04W 36/04* (2009.01)
*H04W 72/04* (2009.01)
*H04W 72/12* (2009.01)

(52) U.S. Cl.
CPC ....... *H04W 36/04* (2013.01); *H04W 72/0493* (2013.01); *H04W 72/1236* (2013.01)

(58) Field of Classification Search
CPC ... H04W 28/26; H04W 72/08; H04W 72/085; H04W 72/087; H04W 64/006; H04W 24/02; H04W 72/0493; H04W 28/22
See application file for complete search history.

(56) References Cited

U.S. PATENT DOCUMENTS

| | | | |
|---|---|---|---|
| 2004/0192341 A1* | 9/2004 | Wang | H04W 28/26 455/456.1 |
| 2006/0030270 A1 | 2/2006 | Cheng | |
| 2010/0173626 A1 | 7/2010 | Catovic et al. | |
| 2010/0333148 A1* | 12/2010 | Musha | H04N 21/2401 725/81 |
| 2013/0244664 A1* | 9/2013 | Song | H04W 36/0085 455/437 |
| 2014/0099967 A1 | 4/2014 | Egner et al. | |
| 2014/0307648 A1 | 10/2014 | Nagata et al. | |
| 2016/0088633 A1 | 3/2016 | Egner et al. | |
| 2016/0381691 A1* | 12/2016 | Panchal | H04L 1/0002 370/329 |
| 2018/0035179 A1* | 2/2018 | Lee | H04W 16/00 |

FOREIGN PATENT DOCUMENTS

| | | |
|---|---|---|
| CN | 104506292 A | 4/2015 |
| CN | 104640224 A | 5/2015 |
| CN | 105636132 A | 6/2016 |
| CN | 106488396 A | 3/2017 |
| JP | 2012204971 A | 10/2012 |
| JP | 2016042701 A | 3/2016 |
| KR | 20110111465 A | 10/2011 |
| KR | 20150087396 A | 7/2015 |

OTHER PUBLICATIONS

Ericsson et al., On details of restricted CSI measurements, 3GPP TSG-RAN WG1#63, R1-105879, Nov. 15-19, 2010, total 4 pages, Agenda Item:6.8.1.1, Jacksonville, US.

\* cited by examiner

DATA TRANSMISSION OPTIMIZATION IN WIRELESS NETWORK WHERE TERMINAL MOVES ALONG TRACK ROUTE

CROSS-REFERENCE TO RELATED APPLICATIONS

This application is a continuation of International Application No. PCT/CN2017/076344, filed on Mar. 10, 2017, the disclosure of which is hereby incorporated by reference in its entirety.

FIELD

This application relates to the field of communications technologies, and in particular, to a data transmission optimization method, a terminal, and a network device.

BACKGROUND

A cell edge performance problem is a major challenge for all mobile networks. For example, a throughput rate at a cell edge is several times different from a throughput rate of a central area of a cell due to co-channel interference. Although a number of technologies such as a coordinated multipoint (CoMP) transmission technology and a transmission time interval bundling (TTI Bundling) technology are dedicated to increasing a throughput rate of an edge user, the throughput rate at the cell edge is still greatly different from the throughput rate of the central area. Therefore, when a terminal moves between a number of cells, for example, moves from a cell center of one cell to a cell edge, then moves to a cell edge of another cell, and subsequently enters a cell center of another cell, a service rate sharply fluctuates. This severely affects quality of a service that requires a relatively high service rate, such as quality of a video service. In particular, when a newly-entered cell of the terminal has relatively heavy load, a handover delay causes sharp degradation in the service quality, such as an occurrence of video freezing.

SUMMARY

Embodiments provide a data transmission optimization method, a terminal, and a network device, to improve service quality when a terminal moves to a cell edge.

According to a first aspect, a data transmission optimization method is provided. In the method, a terminal pre-generates and stores a track context, the track context includes a track route along which the terminal moves and that is passed through by the terminal in a historical time and a to-be-optimized route segment on the track route, and the to-be-optimized route segment may be understood as a location with a cell edge performance problem. In a movement process, if determining to move along the track route included in the track context and reach the to-be-optimized route segment on the track route, the terminal sends a data transmission optimization instruction to a network device, to instruct the network device to perform a data transmission optimization processing operation. After receiving the data transmission optimization instruction sent by the terminal, the network device performs the data transmission optimization processing operation based on the data transmission optimization instruction. The data transmission optimization processing operation includes adjusting a resource allocation policy of the terminal, to ensure that a service (such as a video service) that utilizes a relatively high rate is not affected by the terminal movement process, and improve service quality when the terminal moves to a cell edge.

In a possible example, a value of a predefined measurement parameter meets a preset threshold value range when the terminal moves in the to-be-optimized route segment with the cell edge performance problem exists, and the measurement parameter includes, but is not limited to, signal quality, an uplink throughput rate, and a downlink throughput rate, or may be at least one of the foregoing. The value of the predefined measurement parameter meets the preset threshold value range, and is determined based on a type of the predefined measurement parameter. The value of the measurement parameter may be less than a preset threshold, or may be greater than the preset threshold.

The to-be-optimized route segment may be represented by using a location point at which the terminal enters the to-be-optimized route segment and a location point at which the terminal leaves the to-be-optimized route segment, and the location point may be specific GPS location information, or may be a location identifier bound to a local map maintained by the terminal. The to-be-optimized route segment may be alternatively represented by using a time at which the terminal enters the to-be-optimized route segment and a time at which the terminal leaves the to-be-optimized route segment. The to-be-optimized route segment may be alternatively represented by using a location point and a time at which the terminal enters the to-be-optimized route segment and a location point and a time at which the terminal leaves the to-be-optimized route segment.

In another possible example, before the terminal sends the data transmission optimization instruction to the network device, the network device may send a data transmission optimization instruction parameter to the terminal, and the data transmission optimization instruction parameter includes at least one of a report indication parameter or a configuration parameter. The configuration parameter includes a parameter used to instruct the terminal to configure the data transmission optimization instruction. The parameter used to instruct the terminal to configure the data transmission optimization instruction includes at least one of the following parameters: the predefined measurement parameter and the threshold value range that are utilized by the terminal for determining the to-be-optimized route segment; a time or a location at which the terminal sends the data transmission optimization instruction, where the time or the location at which the terminal sends the data transmission optimization instruction has an association relationship with a start location of the to-be-optimized route segment; and a sending manner in which the terminal sends the data transmission optimization instruction, where the sending manner in which the terminal sends the data transmission optimization instruction includes: separately sending, by the terminal, the data transmission optimization instruction for each to-be-optimized route segment included in the track route, or when determining to move along a track route including a to-be-optimized route segment or determining to enter a first to-be-optimized route segment on the track route for moving, sending, by the terminal, data transmission optimization instructions utilized by all to-be-optimized route segments included in the track route, and a time interval between a time for sending the data transmission optimization instruction and a time for entering each to-be-optimized route segment. After receiving the data transmission optimization instruction parameter that includes the configuration parameter, the terminal may configure the data transmission optimization instruction based on the configuration parameter. The report indication parameter includes a parameter used to indicate that the terminal is allowed to send the data transmission optimization instruction in a cell. After receiving the transmission optimization instruction parameter that includes the report indication parameter, the terminal determines that sending of the data transmission optimization instruction is allowed in the cell, and further sends the data transmission optimization instruction.

In still another possible example, the terminal may determine, in one of the following manners, whether to move along the track route included in the pre-generated track context:

A: Whether to move along the track route included in the pre-generated track context is determined based on schedule information of a user and preference information of the user.

B: Whether to move along the track route included in the pre-generated track context is determined based on information such as a current location, a movement direction, a movement speed, a building identifier, a road topology, and traffic information.

In still another possible embodiment, the terminal may send the data transmission optimization instruction at a specified time or a specified location before determining to reach the start location of the to-be-optimized route segment. The terminal may send, at the specified time or the specified location before reaching the start location of the to-be-optimized route segment each time, the data transmission optimization instruction for the to-be-optimized route segment that is to be reached. When determining to move along a track route including a to-be-optimized route segment or determining to enter the first to-be-optimized route segment on the track route for moving, the terminal may further send the data transmission optimization instructions utilized by all the to-be-optimized route segments included in the track route, and the time interval between the time for sending the data transmission optimization instruction and the time for entering each to-be-optimized route segment.

In still another possible example, if the terminal is to perform a cell handover in the to-be-optimized route segment, the track context further includes identification information of a target cell to which the terminal is to be handed over.

In still another possible example, the data transmission optimization instruction may further include service indication information indicating that the terminal performs a high-rate service. For example, the data transmission optimization instruction includes a video service indication indicating that the terminal performs a video service, so that the terminal sends the data transmission optimization instruction when determining that a currently processed service includes a service that utilizes a relatively high rate.

The data transmission optimization instruction may include one or more of the video service indication, a video service context, handover indication information, or a time interval in which optimization is to be performed. The video service context information includes cache information and bit rate information of the video service. The handover indication information includes the identification information of the target cell to which the terminal is to be handed over.

When the data transmission optimization instruction includes the video service indication indicating that the terminal performs the video service, a data transmission optimization operation indicated by the data transmission optimization instruction may be instructing the network device to increase a resource allocation of the terminal. If the resource allocation of the terminal cannot be increased due to a resource limitation, the data transmission optimization instruction is further used to instruct the network device to send, to the terminal, instruction information used to instruct to reduce a bit rate of the video service. After receiving the data transmission optimization instruction that is sent by the terminal and that includes the video service indication, the network device increases the resource allocation of the terminal based on the data transmission optimization instruction, and if the resource allocation of the terminal cannot be increased due to the resource limitation, the network device sends, to the terminal, the instruction information used to instruct to reduce the bit rate of the video service.

In this embodiment, when the data transmission optimization instruction includes the video service indication indicating that the terminal performs the video service and the video service context information, the data transmission optimization operation indicated by the data transmission optimization instruction may be instructing the network device to increase the resource allocation of the terminal when determining, based on the cache information and the bit rate information, that a volume of data transmitted by the terminal by using an existing resource within a preset duration is less than a data volume utilized for transmitting the video service. The data volume utilized for transmitting the video service may be obtained by subtracting a data volume of a video cache from a data volume corresponding to the bit rate information included in the video service context information within the preset duration, and the data volume of the video cache may be obtained by using the cache information in a video context. The network device receives the data transmission optimization instruction that includes the video service context information and the video service indication, and before increasing the resource allocation of the terminal, determines, based on the cache information and the bit rate information, that the data volume of the data transmitted by the terminal by using the existing resource within the preset duration is less than the data volume utilized for transmitting the video service.

When the data transmission optimization instruction includes the handover indication information, the data transmission optimization instruction is further used to instruct the network device to, before performing the data optimization processing operation, obtain load information of the target cell corresponding to the identification information included in the handover indication information, and determine that load of the target cell is greater than a preset threshold. After receiving the data transmission optimization instruction including the handover indication information, before performing the data optimization processing operation, the network device obtains the load information of the target cell corresponding to the identification information included in the handover indication information, and determines that the load of the target cell is greater than the preset threshold.

When the data transmission optimization instruction includes the handover indication information, the data transmission optimization instruction is further used to instruct a network device to which a serving cell in which the terminal is currently located belongs to send a handover request to a network device to which the target cell belongs, so as to request the network device to which the target cell belongs to make a data transmission optimization preparation in advance. Optionally, the data transmission optimization instruction is further used to instruct the network device to which the serving cell in which the terminal is currently located belongs to send the video service context information of the terminal to the network device to which the target cell belongs. After the network device receives the transmission optimization instruction, the network device sends the handover request to the network device to which the target cell belongs, sends the video service context information of the terminal to the network device to which the target cell belongs, and requests the network device to which the target cell belongs to make the data transmission optimization preparation in advance. The data transmission optimization preparation includes performing access control in advance. The network device to which the target cell belongs makes the data transmission optimization preparation in advance, and when determining that access by the terminal is allowed, sends a handover request response message to the network device to which the serving cell in which the terminal is currently located belongs. After receiving the handover request response message that is sent by the network device to which the target cell belongs and that includes information indicating that access by the terminal is allowed, the network device to which the serving cell in which the terminal is currently located belongs waits for the terminal to report a handover measurement report of the target cell. The network device to which the serving cell in which the terminal is currently located belongs sends a handover command to the terminal when determining that the network device to which the target cell belongs determines that access by the terminal is allowed, and when determining that the handover measurement report of the terminal is received. The target cell corresponds to an identifier of the target cell to which the terminal is to be handed over, and the data transmission optimization preparation includes performing access control in advance.

After sending the handover command, the network device to which the serving cell in which the terminal is currently located belongs may end the data transmission optimization processing operation.

The handover request response message that may be sent by the network device to which the target cell belongs carries the load information, so that the network device to which the serving cell in which the terminal is currently located belongs learns a load status of the target cell.

In still another possible embodiment, the data transmission optimization instruction further includes the time interval in which optimization is to be performed. When the data transmission optimization instruction includes the time interval in which optimization is to be performed, the data transmission optimization instruction is used to instruct the network device to which the serving cell in which the terminal is currently located belongs to perform the data transmission optimization processing operation in the time interval in which optimization is to be performed.

In still another possible embodiment, the data transmission optimization processing operation further includes: enabling a coverage enhancement optimization feature for the terminal, where the coverage enhancement optimization feature includes at least one of a coordinated multipoint transmission technology or a transmission time interval bundling technology.

According to a second aspect, a terminal is provided. The terminal has a function of implementing the terminal in the first aspect, and the function may be implemented by hardware, or may be implemented by hardware by executing corresponding software. The hardware or the software includes one or more modules corresponding to the function. The module may be software and/or hardware.

In a possible embodiment, the terminal includes a processing unit and a sending unit, and may further include a receiving unit, and functions of the receiving unit, the processing unit, and the sending unit may correspond to method steps. Details are not described herein again.

In another possible embodiment, the terminal includes a receiver, a memory, a processor, and a transmitter, the memory is configured to store an instruction, and the processor is configured to: invoke the instruction stored in the memory to implement the function of the processing unit, and control the receiver and the transmitter to implement the functions corresponding to the receiving unit and the sending unit.

According to a third aspect, a network device is provided. The network device has a function of implementing the network device in the first aspect, and the function may be implemented by hardware, or may be implemented by hardware by executing corresponding software. The hardware or the software includes one or more modules corresponding to the function. The module may be software and/or hardware.

In a possible embodiment, the network device includes a receiving unit and a processing unit, and may further include a sending unit, and functions of the receiving unit, the processing unit, and the sending unit may correspond to method steps. Details are not described herein again.

In another possible embodiment, the network device includes a transceiver, a memory, and a processor, the memory is configured to store an instruction, and the processor is configured to: invoke the instruction stored in the memory to implement the function of the processing unit, and control the transceiver to implement the functions corresponding to the receiving unit and the sending unit.

According to the data transmission optimization method, the terminal, and the network device that are provided in this application, the terminal determines to move along the track route included in the pre-generated track context and reach the to-be-optimized route segment on the track route, and sends the data transmission optimization instruction to the network device, to instruct the network device to perform the data transmission optimization processing operation. After receiving the data transmission optimization instruction sent by the terminal, the network device performs the data transmission optimization processing operation based on the data transmission optimization instruction, to ensure that a service (such as the video service) that utilizes a relatively high rate is not affected by the terminal movement process, and improve service quality when the terminal moves to the cell edge.

DETAILED DESCRIPTION OF EMBODIMENTS

The following describes the embodiments with reference to accompanying drawings.

First, some terms in this application are explained and described for ease of understanding by a person skilled in the art.

A network device may be referred to as a radio access network ( ) device, a device that connects a terminal to a wireless network, and includes, but is not limited to: an evolved NodeB (eNB), a radio network controller (RNC), a NodeB), a base station controller (BSC), a base transceiver station (BTS), a home eNodeB (for example, a home evolved NodeB, or a home NodeB, HNB), a baseband unit (BBU), a wireless fidelity (WI-FI) access point (AP), a transmission point (transmission and receiver point, TRP), or the like.

A terminal is a device that provides voice and/or data connectivity to a user, and may include various handheld devices, in-vehicle devices, wearable devices, or computing devices that have a wireless communication function, or another processing device connected to a wireless modem, and various forms of user equipment, a mobile station, a terminal (terminal equipment), and a transmission point (transmission and receiver point, TRP).

"Exchange" in this application is a process in which two exchanging parties transfer information to each other. The transferred information herein may be the same or different. For example, the two exchanging parties are a base station 1 and a base station 2. The base station 1 may request information from the base station 2, and the base station 2 provides the information requested by the base station 1 to the base station 1. Additionally, the base station 1 and the base station 2 may request information from each other. The requested information herein may be the same or different.

"A number of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The terms "network" and "system" are always used alternately, but a person of ordinary skill in the art can understand their meanings. The terms information, signal, message, and channel may be mixed sometimes. Additionally, meanings of the terms are consistent when differences between the terms are not stressed. "Of", "corresponding", and "relevant" may be mixed sometimes. Also, meanings of the terms are consistent when differences between the terms are not stressed.

Figure 1:
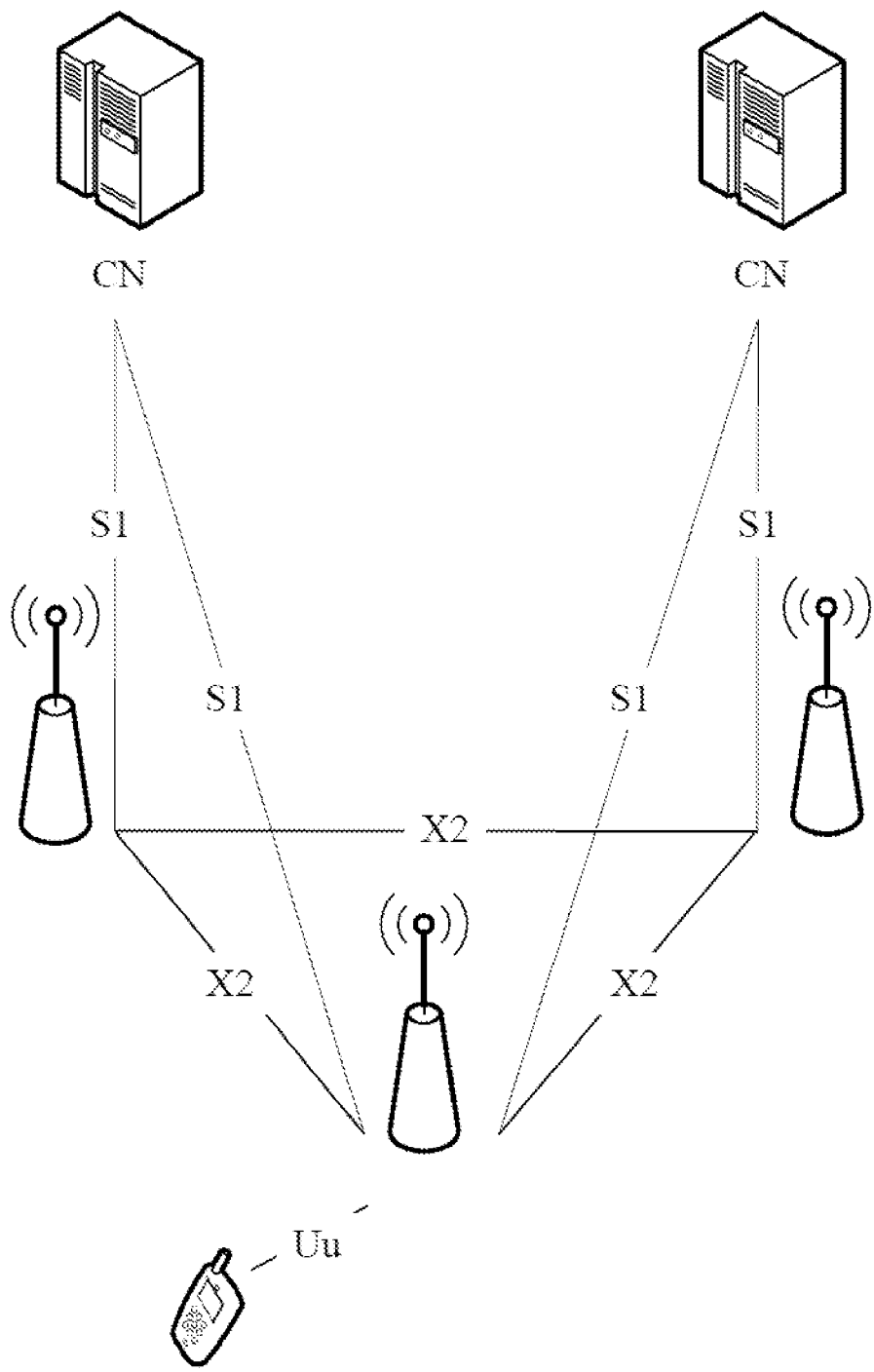
FIG. 1 is a schematic architectural diagram of a wireless communications system in an embodiment.

A data transmission optimization method provided in the embodiments may be applied to a wireless communications system shown in FIG. 1. As shown in FIG. 1, a terminal accesses a wireless network by using a network device such as a base station, and the terminal communicates with an external network by using a core network device. In the system, base stations may exchange information. For example, in a long term evolution (LTE) system, an interface between base stations is referred to as an X2 interface, and the base stations may exchange information by using the X2 interface. In addition, an interface between a base station and a terminal is referred to as a Uu interface, or referred to as an air interface, and the base station communicates with the terminal by using the air interface. An interface between a base station and a CN device is referred to as an S1 interface, and the base station communicates with the CN device by using the S1 interface. The core network device may include a mobility management entity (MME) and a serving gateway (S-GW). The base station and the S-GW exchange user-plane information, and the base station and the MME exchange control-plane information.

It may be understood that the wireless communications system is a network that provides a wireless communication function. Different communications technologies may be used in the wireless communications system, for example, code division multiple access (CDMA), wideband code division multiple access (WCDMA), time division multiple access (TDMA), frequency division multiple access (FDMA), orthogonal frequency division multiple access ( ), single carrier frequency division multiple access (-FDMA), and carrier sense multiple access with collision avoidance. Based on factors such as capacities, rates, and delays of different networks, networks may be classified into a 2G network, a 3G network, a 4G network, and a future evolved network such as a 5G network. A typical 2G network includes a global system for mobile communications (GSM) network or a general packet radio service (GPRS) network. A typical 3G network includes a universal mobile telecommunications system (UMTS) network. A typical 4G network includes a long term evolution (LTE) network. The UMTS network sometimes may also be referred to as a universal terrestrial radio access network (UTRAN), and the LTE network sometimes may also be referred to as an evolved universal terrestrial radio access network (E-UTRAN). Based on different resource allocation manners, networks may be classified into a cellular communications network and a wireless local area network (WLAN). The cellular communications network is based on scheduling, and the WLAN is based on contention. All the foregoing 2G, 3G, and 4G networks are cellular communications networks. A person of ordinary skill in the art understands that, with development of technologies, the technical solutions provided in the embodiments may also be applied to another wireless communications network such as a 4.5G or 5G network, or another non-cellular communications network. For brevity, the wireless communications network sometimes is referred to as a network for short in the embodiments described herein.

The cellular communications network is a type of wireless communications network. The cellular communications network uses a cellular wireless networking mode, and connects a terminal to a network device by using a wireless channel, to implement mutual communication in a terminal movement process. The cellular communications network is mainly characterized by mobility of a terminal, and has functions of an inter-cell handover and automatic roaming across a local network.

In the terminal movement process, a service rate sharply fluctuates due to a cell edge performance problem. This severely affects quality of a service that utilizes a relatively high service rate, such as quality of a video service. In particular, when a newly-entered cell of the terminal has relatively heavy load, a handover delay causes sharp degradation in the service quality, such as occurrence of video freezing.

In the embodiments, a terminal pre-generates a track context, the track context includes a track route along which the terminal moves and that is passed through by the terminal in a historical time and a to-be-optimized route segment on the track route, and the to-be-optimized route segment may be understood as a location with a cell edge performance problem. A value of a predefined measurement parameter meets a preset threshold value range when the terminal moves in the to-be-optimized route segment, and the measurement parameter includes but is not limited to signal quality, an uplink throughput rate, and a downlink throughput rate. Therefore, in a movement process, if determining to move along the track route included in the track context and reach the to-be-optimized route segment on the track route, the terminal sends a data transmission optimization instruction to a network device, so as to instruct the network device to perform a data transmission optimization processing operation, to ensure that a service (such as a video service) that utilizes a relatively high rate is not affected by the terminal movement process, and improve service quality when the terminal moves to a cell edge.

In the embodiments described herein, the following describes the data transmission optimization method provided in this application with reference to actual application.

Figure 2:
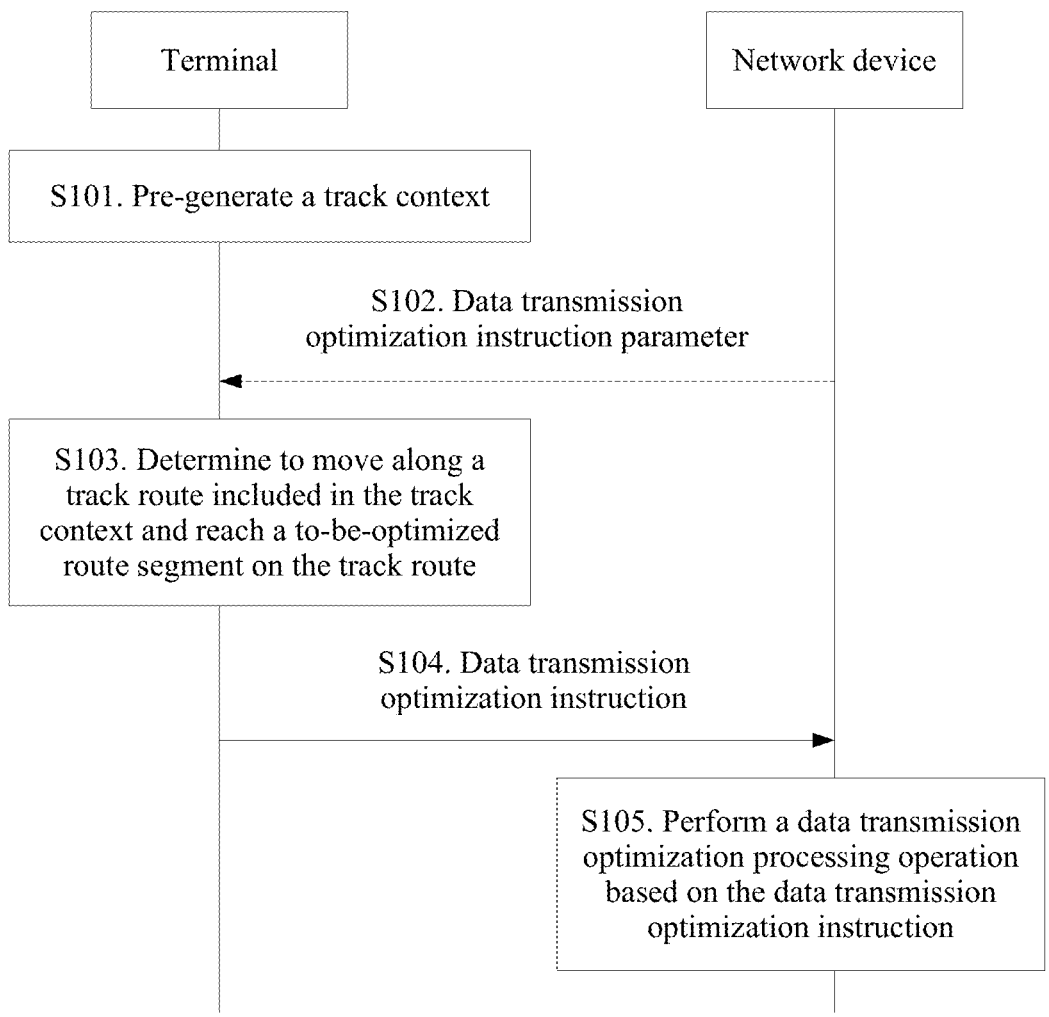
FIG. 2 is a flowchart of implementation of a data transmission optimization method according to an embodiment.

FIG. 2 is a flowchart of an implementation of a data transmission optimization method according to an embodiment. Referring to FIG. 2, the method includes:

In step S101, a terminal pre-generates a track context.

The track context includes a track route along which the terminal moves and that is passed through by the terminal in a historical time and a to-be-optimized route segment on the track route, and the to-be-optimized route segment may be understood as a location with a cell edge performance problem. A value of a predefined measurement parameter meets a preset threshold value range when the terminal moves in the to-be-optimized route segment, and the measurement parameter includes but is not limited to signal quality, an uplink throughput rate, and a downlink throughput rate, or may be at least one of the foregoing.

Figure 3:
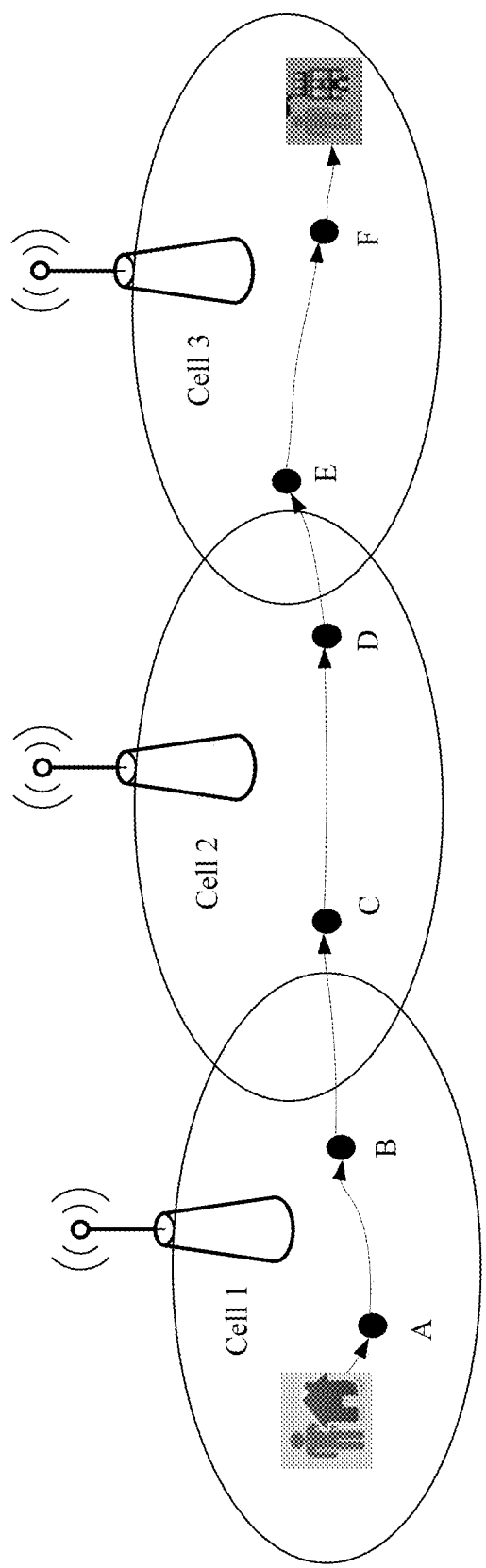
FIG. 3 is a schematic diagram of a track route recorded by a terminal according to an embodiment.

There may be a number of track contexts pre-generated by the terminal, and a manner of generating the track context includes, but is not limited to, methods such as historical data learning, a least square method, and big data clustering. For example, the terminal may record a track route for daily movement. As shown in FIG. 3, a user carrying a terminal goes to a company from a residence every day, a track route that is passed through is a route represented by A→F, the terminal records the track route A→F, and records all to-be-optimized route segments on the track route. All the recorded to-be-optimized route segments may be arranged according to a sequence of entering these route segments by the terminal. On the track route A→F shown in FIG. 3, the terminal moves from a cell center of a cell 1 to an edge of the cell 1, moves to a cell edge of a cell 2, enters a cell center of the cell 2, then moves from the cell center of the cell 2 to an edge of the cell 2, moves to a cell edge of a cell 3, and enters a cell center of the cell 3. The to-be-optimized route segments may include a to-be-optimized route segment (a to-be-optimized route segment BC) between an edge location of the cell 1 and an edge location of the cell 2 and a to-be-optimized route segment (a to-be-optimized route segment DE) between an edge location of the cell 2 and an edge location of the cell 3. A value of a predefined measurement parameter in the to-be-optimized route segment BC and the to-be-optimized route segment DE meets a preset threshold value range. The predefined measurement parameter may be signal quality such as a reference signal received power (RSRP) or reference signal received power (RSRQ), or may be a downlink rate or an uplink sending rate of the user. The preset threshold value range may be configured by a network device, or may be an empirical value of the terminal, or a predefined value. For example, when the measurement parameter is the signal quality, the uplink throughput rate, or the downlink throughput rate, the value of the measurement parameter is less than a preset threshold. When the measurement parameter is cell load, the value of the measurement parameter may be greater than the preset threshold.

In this embodiment, the to-be-optimized route segment included in the track context pre-generated by the terminal may be represented in at least one of the following manners.

A: The to-be-optimized route segment is represented by using a location point at which the terminal enters the to-be-optimized route segment and a location point at which the terminal leaves the to-be-optimized route segment, and the location point may be specific global positioning system (GPS) location information, or may be a location identifier bound to a local map maintained by the terminal, such as number xx of road xx.

B: The to-be-optimized route segment is represented by using a time at which the terminal enters the to-be-optimized route segment and a time at which the terminal leaves the to-be-optimized route segment.

C: The to-be-optimized route segment is represented by using a location point and a time at which the terminal enters the to-be-optimized route segment and a location point and a time at which the terminal leaves the to-be-optimized route segment.

If the terminal is to perform a cell handover in the to-be-optimized route segment, the track context pre-generated by the terminal further includes identification information of a target cell to which the terminal is to be handed over. The terminal may determine, by determining whether there is record information about handover measurement event reporting in each to-be-optimized route segment, whether to perform the cell handover in the to-be-optimized route segment; and if a measurement event is reported, determine to perform the cell handover in the to-be-optimized route segment. For example, in the schematic diagram shown in FIG. 3, if the terminal determines that there is record information that records measurement event reporting in the to-be-optimized route segment BC and the to-be-optimized route segment DE, the terminal determines to perform cell handovers. The track context pre-generated by the terminal further includes identification information of the cell 2 and the cell 3.

Optionally, whether to perform a cell handover in a particular to-be-optimized route segment may be determined by the terminal based on whether there is a record of handover measurement event reporting, or by determining whether a handover command corresponding to a handover measurement event is delivered within a predetermined time.

In this embodiment, the track context pre-generated by the terminal may be represented in a manner described in Table 1, but is not limited to the manner described in Table 1.

TABLE 1

| | Track context | | |
|---|---|---|---|
| Track route | To-be-optimized route segment | Identification information of a target cell |
| A->F (A->B->C->D->E-> F) | [B, C], or [t1, t2], or [(B, t1), (C, t2)] | Cell 2 |
| | [D, E], or [t3, t4], or [(D, t3), (E, t4)] | Cell 3 |

In Table 1, A is a start location point of the track route recorded by the terminal, and F is an end location point of the track route recorded by the terminal. B is a location point at which the terminal enters a first to-be-optimized route segment, and C is a location point at which the terminal leaves the first to-be-optimized route segment. D is a location point at which the terminal enters a second to-be-optimized route segment, and E is a location point at which the terminal leaves the second to-be-optimized route segment. t1 represents a time at which the terminal enters the first to-be-optimized route segment, t2 represents a time at which the terminal leaves the first to-be-optimized route segment, t3 represents a time at which the terminal enters the second to-be-optimized route segment, and t4 represents a time at which the terminal leaves the second to-be-optimized route segment.

In step S102, a network device sends a data transmission optimization instruction parameter to the terminal, and the terminal receives the data transmission optimization instruction parameter sent by the network device.

The data transmission optimization instruction parameter includes at least one of a report indication parameter or a configuration parameter.

The report indication parameter includes a parameter used to indicate that the terminal is allowed to send a data transmission optimization instruction in a cell, and the parameter used to indicate that the terminal is allowed to send a data transmission optimization instruction in a cell may be specific to each cell or may be specific to each terminal.

The configuration parameter includes a parameter used to instruct the terminal to configure the data transmission optimization instruction. The parameter used to instruct the terminal to configure the data transmission optimization instruction includes at least one of the following parameters:

A: the predefined measurement parameter and the threshold value range that are utilized by the terminal for determining the to-be-optimized route segment;

B: a time or a location at which the terminal sends the data transmission optimization instruction, where the time or the location at which the terminal sends the data transmission optimization instruction has an association relationship with a start location of the to-be-optimized route segment, for example, the time at which the terminal sends the data transmission optimization instruction is a specified time before the start location of the to-be-optimized route segment is reached, and the location at which the terminal sends the data transmission optimization instruction is a specified location before the start location of the to-be-optimized route segment; and C: a sending manner in which the terminal sends the data transmission optimization instruction, where the sending manner in which the terminal sends the data transmission optimization instruction includes: separately sending, by the terminal, the data transmission optimization instruction for each to-be-optimized route segment included in the track route, or when determining to move along a track route including a to-be-optimized route segment or determining to enter a first to-be-optimized route segment on the track route for moving, sending, by the terminal, data transmission optimization instructions utilized by all to-be-optimized route segments included in the track route, and a time interval between a time for sending the data transmission optimization instruction and a time for entering each to-be-optimized route segment.

It may be understood that step S102 in this embodiment is an optional step. If step S102 is not included, the terminal may be preconfigured to be allowed to send the data transmission optimization instruction in a cell, and the data transmission optimization instruction is configured in a preconfigured manner.

In step S103, the terminal determines to move along a track route included in the track context and reach a to-be-optimized route segment on the track route.

In this embodiment, the terminal may directly determine whether to move along the track route included in the pre-generated track context and reach the to-be-optimized route segment on the track route, or may determine, when the terminal determines that data transmission optimization should be performed (for example, the terminal determines that a currently processed service includes a service that utilizes a relatively high rate, and the service that utilizes a relatively high rate includes but is not limited to a video service, a live broadcast service, an FTP upload service with a high urgency degree, and the like), whether to move along the track route included in the pre-generated track context and reach the to-be-optimized route segment on the track route.

In this embodiment, the terminal may determine, in one of the following manners, whether to move along the track route included in the pre-generated track context:

A: Whether to move along the track route included in the pre-generated track context is determined based on schedule information of the user and preference information of the user. For example, if a current time is office hours of a working day, and the user always moves from A to B along the track A→F, it can be determined that the terminal moves on a working route (track route) A→F.

B: Whether to move along the track route included in the pre-generated track context is determined based on information such as a current location, a movement direction, a movement speed, a building identifier, a road topology, and traffic information. For example, A→F are location points on a road X, and the terminal currently moves in a direction from A to F on the road X. It can be determined that the terminal moves on the track route A→F.

In step S104, the terminal sends a data transmission optimization instruction to the network device.

In this embodiment, if determining to move along the track route included in the track context and reach the to-be-optimized route segment on the track route, the terminal sends the data transmission optimization instruction to the network device. The data transmission optimization instruction is used to instruct the network device to perform a data transmission optimization processing operation, and the data transmission optimization processing operation includes adjusting a resource allocation policy of the terminal.

In this embodiment, the terminal may send the data transmission optimization instruction at the specified time or the specified location before determining to reach the start location of the to-be-optimized route segment. The terminal may separately send the data transmission optimization instruction for each to-be-optimized route segment included in the track route, in other words, the terminal sends, at the specified time or the specified location before reaching the start location of the to-be-optimized route segment each time, the data transmission optimization instruction for the to-be-optimized route segment that is to be reached. When determining to move along the track route including the to-be-optimized route segment or determining to enter the first to-be-optimized route segment on the track route for moving, the terminal may further send the data transmission optimization instructions utilized by all the to-be-optimized route segments included in the track route, and the time interval between the time for sending the data transmission optimization instruction and the time for entering each to-be-optimized route segment.

In this embodiment, if determining that a currently processed service includes a service that utilizes a relatively high rate, the terminal sends the data transmission optimization instruction, and the data transmission optimization instruction may further include service indication information indicating that the terminal performs a high-rate service, for example, the data transmission optimization instruction includes a video service indication indicating that the terminal performs a video service.

In this embodiment, an example in which the data transmission optimization instruction includes the video service indication indicating that the terminal performs the video service is used below for description. Another service type is similar, and details are not described herein again.

In this embodiment, when the data transmission optimization instruction includes the video service indication indicating that the terminal performs the video service, a data transmission optimization operation indicated by the data transmission optimization instruction may be instructing the network device to increase a resource allocation of the terminal. If the resource allocation of the terminal cannot be increased due to a resource limitation, the data transmission optimization instruction is further used to instruct the network device to send, to the terminal, instruction information used to instruct to reduce a bit rate of the video service.

In this embodiment, the data transmission optimization instruction may further include video service context information, and the video service context information includes cache information and bit rate information of the video service.

In this embodiment, when the data transmission optimization instruction includes the video service indication indicating that the terminal performs the video service and the video service context information, the data transmission optimization operation indicated by the data transmission optimization instruction may be instructing the network device to increase the resource allocation of the terminal when determining, based on the cache information and the bit rate information, that a volume of data transmitted by the terminal by using an existing resource within a preset duration is less than a data volume utilized for transmitting the video service. For example, the data volume utilized for transmitting the video service may be obtained by subtracting a data volume of a video cache from a data volume corresponding to the bit rate information included in the video service context information within the preset duration, and the data volume of the video cache may be obtained by using the cache information in a video context.

In this embodiment, the data transmission optimization instruction may further include handover indication information, and the handover indication information includes the identification information of the target cell to which the terminal is to be handed over.

In this embodiment, when the data transmission optimization instruction includes the handover indication information, the data transmission optimization instruction is further used to instruct the network device to, before performing the data optimization processing operation, obtain load information of the target cell corresponding to the identification information included in the handover indication information, and determine that load of the target cell is greater than a preset threshold.

In this embodiment, when the data transmission optimization instruction includes the handover indication information, the data transmission optimization instruction is further used to instruct a network device to which a serving cell in which the terminal is currently located belongs to send a handover request to a network device to which the target cell belongs, so as to request the network device to which the target cell belongs to make a data transmission optimization preparation in advance. Optionally, the data transmission optimization instruction is further used to instruct the network device to which the serving cell in which the terminal is currently located belongs to send the video service context information of the terminal to the network device to which the target cell belongs. The network device to which the target cell belongs makes the data transmission optimization preparation in advance, where the data transmission optimization preparation includes performing access control in advance, and when determining that access by the terminal is allowed, sends a handover request response message to the network device to which the serving cell in which the terminal is currently located belongs. After receiving the handover request response message that is sent by the network device to which the target cell belongs and that includes information indicating that access by the terminal is allowed, the network device to which the serving cell in which the terminal is currently located belongs waits for the terminal to report a handover measurement report of the target cell. The network device to which the serving cell in which the terminal is currently located belongs sends a handover command to the terminal when determining that the network device to which the target cell belongs determines that access by the terminal is allowed, and when determining that the handover measurement report of the terminal is received. The target cell corresponds to an identifier of the target cell to which the terminal is to be handed over, and the data transmission optimization preparation includes performing access control in advance.

After sending the handover command, the network device to which the serving cell in which the terminal is currently located belongs may end the data transmission optimization processing operation.

The handover request response message that may be sent by the network device to which the target cell belongs carries the load information, so that the network device to which the serving cell in which the terminal is currently located belongs learns a load status of the target cell.

In this embodiment, the data transmission optimization instruction further includes a time interval in which optimization is to be performed. When the data transmission optimization instruction includes the time interval in which optimization is to be performed, the data transmission optimization instruction is used to instruct the network device to which the serving cell in which the terminal is currently located belongs to perform the data transmission optimization processing operation in the time interval in which optimization is to be performed.

In this embodiment, the data transmission optimization instruction may include one or more of the video service indication, a video service context, the handover indication information, or the time interval in which optimization is to be performed. This is not specifically limited. For example, the data transmission optimization instruction reported by the terminal may be shown in Table 2 or Table 3, but is not limited thereto.

TABLE 2

| Parameter included in the data transmission optimization instruction | Parameter content |
|---|---|
| Video service indication | Identifying whether a current service includes a video service. |

TABLE 2-continued

| Parameter included in the data transmission optimization instruction | Parameter content |
|---|---|
| Video service context | Cache information and bit rate information |
| Time interval in which optimization is to be performed | 20 ms |

TABLE 3

| Parameter included in the data transmission optimization instruction | Parameter content |
|---|---|
| Video service indication | Identifying whether a current service includes a video service. |
| Video service context | Cache information and bit rate information |
| Time interval in which optimization is to be performed | 20 ms |
| Handover indication information | Identification information of the target cell |

In this embodiment, the data transmission optimization processing operation indicated by the data transmission optimization instruction further includes: instructing the network device to enable a coverage enhancement optimization feature for the terminal, where the coverage enhancement optimization feature includes at least one of CoMP or TTI bunding.

In step S105, the network device receives the data transmission optimization instruction sent by the terminal, and performs a data transmission optimization processing operation based on the data transmission optimization instruction.

In this embodiment, the data transmission optimization processing operation performed by the network device includes adjusting the resource allocation policy of the terminal. A specific data transmission optimization processing operation corresponds to the data transmission optimization processing operation indicated by the data transmission optimization instruction in step S104, and details are not described herein again.

The foregoing mainly describes the solutions provided in the embodiments from a perspective of interaction between the terminal and the network device. It may be understood that to implement the foregoing functions, the terminal and the network device include corresponding hardware structures and/or software modules for performing the functions. With reference to the units and algorithm steps described in the embodiments disclosed in this application, the embodiments can be implemented in a form of hardware or hardware and computer software. Whether a function is performed by hardware or hardware driven by computer software depends on particular applications and design constraints of the technical solutions. A person of ordinary skill in the art may use different methods to implement the described functions for each particular application, but it should not be considered that the implementation falls beyond the scope of the technical solutions in the embodiments.

In an embodiment, function unit division may be performed on the terminal and the network device based on the foregoing method example. For example, each function unit may be obtained through division based on a corresponding function, or two or more functions may be integrated into one processing unit. The integrated unit may be implemented in a form of hardware, or may be implemented in a form of a software functional unit. It should be noted that, in this embodiment of the present invention, unit division is an example, and is merely a logical function division. In actual implementation, another division manner may be used.

Figure 4:
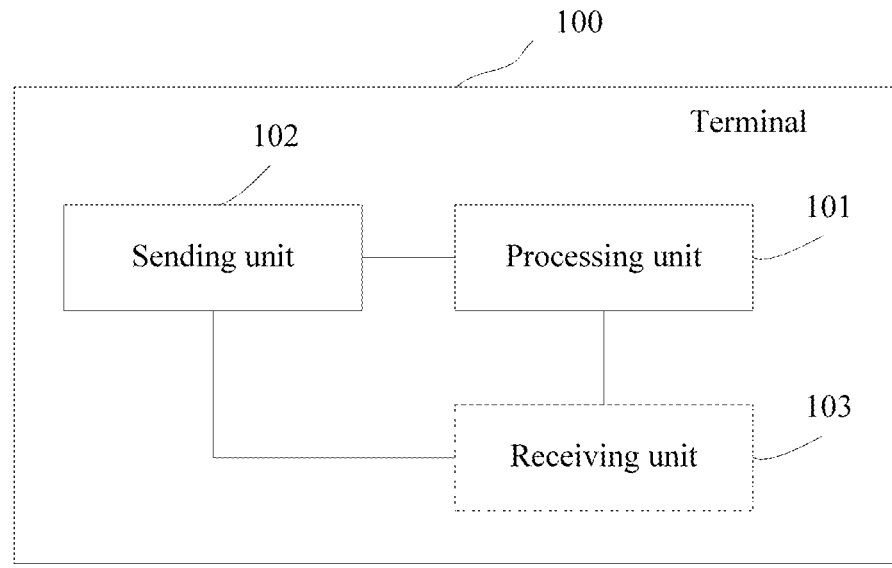
FIG. 4 is a schematic structural diagram of a terminal according to an embodiment.

When an integrated unit is used, FIG. 4 is a schematic structural diagram of a terminal. Referring to FIG. 4, a terminal 100 includes a processing unit 101 and a sending unit 102. The processing unit 101 is configured to determine that the terminal is to move along a track route included in a track context and reach a to-be-optimized route segment on the track route, where the track context is pre-generated by the terminal, and includes a track route along which the terminal moves and that is passed through by the terminal in a historical time and a to-be-optimized route segment on the track route, a value of a predefined measurement parameter meets a preset threshold value range when the terminal moves in the to-be-optimized route segment, and the measurement parameter includes at least one of signal quality, an uplink throughput rate, or a downlink throughput rate. The sending unit 102 is configured to send a data transmission optimization instruction to a network device when the processing unit 101 determines that the terminal is to move along the track route included in the track context and reach the to-be-optimized route segment on the track route, where the data transmission optimization instruction is used to instruct the network device to perform a data transmission optimization processing operation, and the data transmission optimization processing operation includes adjusting a resource allocation policy of the terminal.

The terminal further includes a receiving unit 103, and the receiving unit 103 is configured to: before the sending unit 102 sends the data transmission optimization instruction to the network device, receive a data transmission optimization instruction parameter sent by the network device, where the data transmission optimization instruction parameter includes at least one of a report indication parameter or a configuration parameter. The report indication parameter includes a parameter used to indicate that the terminal is allowed to send the data transmission optimization instruction in a cell. The configuration parameter includes a parameter used to instruct the terminal to configure the data transmission optimization instruction.

The parameter used to instruct the terminal to configure the data transmission optimization instruction includes at least one of the following parameters:

the predefined measurement parameter and the threshold value range that are utilized by the terminal for determining the to-be-optimized route segment;

a time or a location at which the terminal sends the data transmission optimization instruction, where the time or the location at which the terminal sends the data transmission optimization instruction has an association relationship with a start location of the to-be-optimized route segment; and a sending manner in which the terminal sends the data transmission optimization instruction, where the sending manner in which the terminal sends the data transmission optimization instruction includes: separately sending, by the terminal, the data transmission optimization instruction for each to-be-optimized route segment included in the track route, or when determining to move along the track route including the to-be-optimized route segment or determining to enter a first to-be-optimized route segment on the track route for moving, sending, by the terminal, data transmission optimization instructions utilized by all to-be-optimized route segments included in the track route, and a time interval between a time for sending the data transmission optimization instruction and a time for entering each to-be-optimized route segment.

In a possible implementation, the track context further includes identification information of a target cell to which the terminal is to be handed over, and the processing unit 101 is further configured to: if the terminal is to perform a cell handover in the to-be-optimized route segment, perform the cell handover based on the identification information of the target cell.

In another possible implementation, the data transmission optimization instruction includes a video service indication indicating that the terminal performs a video service; and the data transmission optimization processing operation includes: increasing a resource allocation of the terminal, and if the resource allocation of the terminal cannot be increased due to a resource limitation, sending, to the terminal, instruction information used to instruct to reduce a bit rate of the video service.

In still another possible implementation, the data transmission optimization instruction further includes video service context information, and the video service context information includes cache information and bit rate information of the video service; and the data transmission optimization instruction is further used to instruct the network device to determine, based on the cache information and the bit rate information before increasing the resource allocation of the terminal, that a volume of data transmitted by the terminal by using an existing resource within a preset duration is less than a data volume utilized for transmitting the video service.

In still another possible implementation, the data transmission optimization instruction further includes handover indication information, and the handover indication information includes the identification information of the target cell to which the terminal is to be handed over; and the data transmission optimization instruction is further used to instruct the network device to, before performing the data optimization processing operation, obtain load information of the target cell corresponding to the identification information and determine that load of the target cell is greater than a preset threshold.

In still another possible implementation, the data transmission optimization instruction is further used to: instruct a network device to which a serving cell in which the terminal is currently located belongs to send a handover request to a network device to which the target cell belongs, send the video service context information of the terminal to the network device to which the target cell belongs, and request the network device to which the target cell belongs to make a data transmission optimization preparation in advance; and instruct the network device to which the serving cell belongs to send a handover command to the terminal when it is determined that the network device to which the target cell belongs determines that access by the terminal is allowed, and when it is determined that a handover measurement report of the terminal is received; and the data transmission optimization preparation includes performing access control in advance.

In still another possible implementation, the data transmission optimization processing operation includes: enabling a coverage enhancement optimization feature for the terminal, where the coverage enhancement optimization feature includes at least one of a coordinated multipoint transmission technology or a transmission time interval bundling technology.

In still another possible implementation, the data transmission optimization instruction further includes a time interval in which optimization is to be performed, and is used to instruct the network device to perform the data transmission optimization processing operation in the time interval in which optimization is to be performed.

When a hardware form is used for implementation, in this embodiment, the processing unit 101 may be a processor or a controller, the sending unit 102 may be a communications interface, a transmitter, a transceiver circuit, or the like, and the receiving unit 103 may be a communications interface, a receiver, a transceiver circuit, or the like. The communications interface is a collective name, and may include one or more interfaces.

Figure 5:
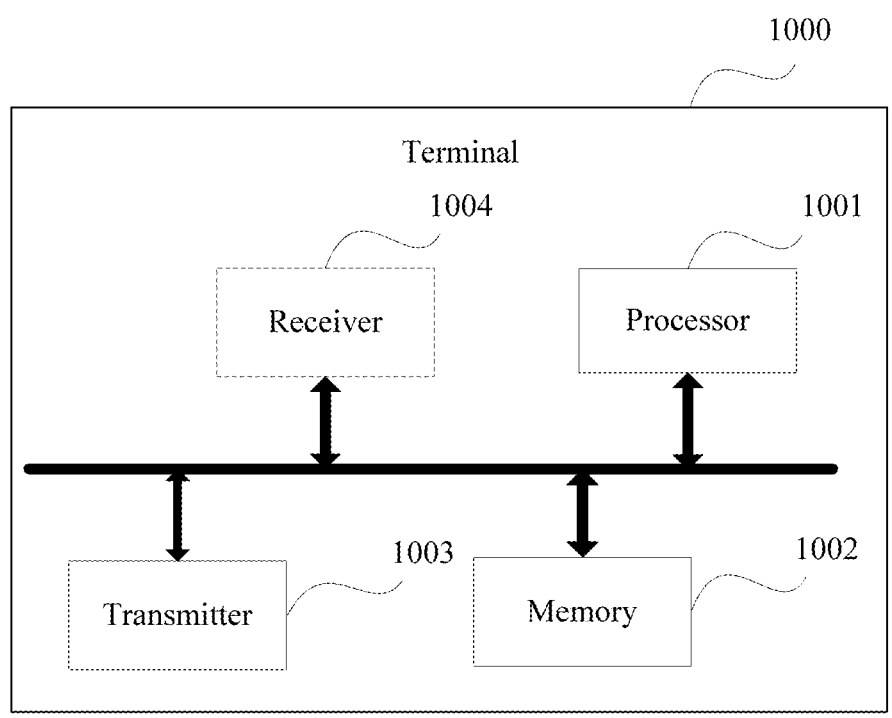
FIG. 5 is a schematic structural diagram of another terminal according to an embodiment.

When the processing unit 101 is a processor, the sending unit 102 is a transmitter, and the receiving unit 103 is a receiver, the terminal 100 in this embodiment may be a terminal shown in FIG. 5. FIG. 5 is a schematic structural diagram of a terminal 1000 according to an embodiment, namely, a schematic structural diagram of another possible terminal in the embodiments. Referring to FIG. 5, the terminal 1000 includes a processor 1001, a memory 1002, and a transmitter 1003. The memory 1002 is configured to store an instruction, and the processor 1001 is configured to: invoke the instruction stored in the memory 1002 to perform the following function of the processor 1001, and control the transmitter 1003 to perform the following function:

the processor 1001 is configured to determine that the terminal is to move along a track route included in a track context and reach a to-be-optimized route segment on the track route, where the track context is pre-generated by the terminal, and includes a track route along which the terminal moves and that is passed through by the terminal in a historical time and a to-be-optimized route segment on the track route, a value of a predefined measurement parameter meets a preset threshold value range when the terminal moves in the to-be-optimized route segment, and the measurement parameter includes at least one of signal quality, an uplink throughput rate, or a downlink throughput rate; and the transmitter 1003 is configured to send a data transmission optimization instruction to a network device when the processor 1001 determines that the terminal is to move along the track route included in the track context and reach the to-be-optimized route segment on the track route, where the data transmission optimization instruction is used to instruct the network device to perform a data transmission optimization processing operation, and the data transmission optimization processing operation includes adjusting a resource allocation policy of the terminal.

The terminal further includes a receiver 1004, and the processor 1001 is further configured to control the receiver 1004 to perform the following function:

before the transmitter 1003 sends the data transmission optimization instruction to the network device, receiving a data transmission optimization instruction parameter sent by the network device, where the data transmission optimization instruction parameter includes at least one of a report indication parameter or a configuration parameter.

In a possible embodiment, the track context further includes identification information of a target cell to which the terminal is to be handed over, and the processor 1001 is further configured to: if the terminal is to perform a cell handover in the to-be-optimized route segment, perform the cell handover based on the identification information of the target cell.

Figure 6:
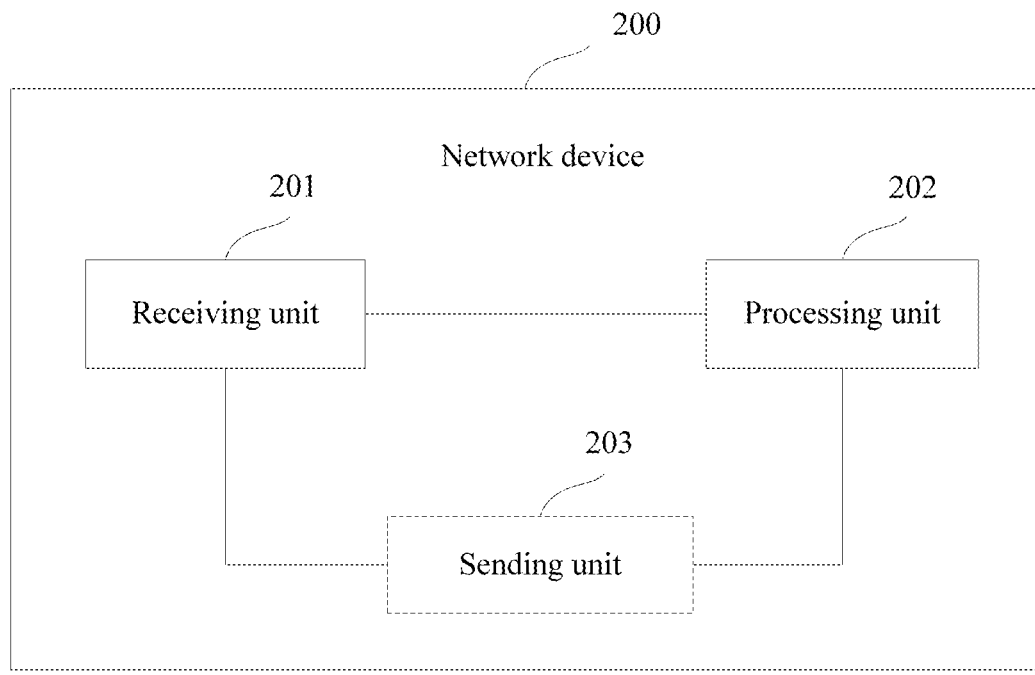
FIG. 6 is a schematic structural diagram of a network device according to an embodiment.

When an integrated unit is used, FIG. 6 is a possible schematic structural diagram of a network device. Referring to FIG. 6, a network device 200 includes a receiving unit 201 and a processing unit 202. The receiving unit 201 is configured to receive a data transmission optimization instruction sent by a terminal, where the data transmission optimization instruction is sent by the terminal when determining to move along a track route included in a track context and reach a to-be-optimized route segment on the track route, and is used to instruct the network device to perform a data transmission optimization processing operation, the data transmission optimization processing operation includes adjusting a resource allocation policy of the terminal, the track context is pre-generated by the terminal, and includes a track route along which the terminal moves and that is passed through by the terminal in a historical time and a to-be-optimized route segment on the track route, a value of a predefined measurement parameter meets a preset threshold value range when the terminal moves in the to-be-optimized route segment, and the measurement parameter includes at least one of signal quality, an uplink throughput rate, or a downlink throughput rate. The processing unit 202 is configured to perform the data transmission optimization processing operation based on the data transmission optimization instruction received by the receiving unit 201.

In a possible implementation, the network device further includes a sending unit 203, and the sending unit 203 is configured to: before the receiving unit 201 receives the data transmission optimization instruction sent by the terminal, send a data transmission optimization instruction parameter to the terminal, where the data transmission optimization instruction parameter includes at least one of a report indication parameter or a configuration parameter. The report indication parameter includes a parameter used to indicate that the terminal is allowed to send the data transmission optimization instruction in a cell. The configuration parameter includes a parameter used to instruct the terminal to configure the data transmission optimization instruction.

The parameter used to instruct the terminal to configure the data transmission optimization instruction includes at least one of the following parameters:

the predefined measurement parameter and the threshold value range that are utilized by the terminal for determining the to-be-optimized route segment;

a time or a location at which the terminal sends the data transmission optimization instruction, where the time or the location at which the terminal sends the data transmission optimization instruction has an association relationship with a start location of the to-be-optimized route segment; and a sending manner in which the terminal sends the data transmission optimization instruction, where the sending manner in which the terminal sends the data transmission optimization instruction includes: separately sending, by the terminal, the data transmission optimization instruction for each to-be-optimized route segment included in the track route, or when determining to move along the track route including the to-be-optimized route segment or determining to enter a first to-be-optimized route segment on the track route for moving, sending, by the terminal, data transmission optimization instructions utilized by all to-be-optimized route segments included in the track route, and a time interval between a time for sending the data transmission optimization instruction and a time for entering each to-be-optimized route segment.

In another possible implementation, if the terminal is to perform a cell handover in the to-be-optimized route segment, the track context further includes identification information of a target cell to which the terminal is to be handed over.

In still another possible implementation, the data transmission optimization instruction includes a video service indication indicating that the terminal performs a video service; and the processing unit 202 performs the data transmission optimization processing operation based on the data transmission optimization instruction in the following manner: increasing a resource allocation of the terminal, and if the resource allocation of the terminal cannot be increased due to a resource limitation, sending, to the terminal, instruction information used to instruct to reduce a bit rate of the video service.

In still another possible implementation, the data transmission optimization instruction further includes video service context information, and the video service context information includes cache information and bit rate information of the video service; and the processing unit 202 is further configured to determine, based on the cache information and the bit rate information before increasing the resource allocation of the terminal, that a volume of data transmitted by the terminal by using an existing resource within a preset duration is less than a data volume utilized for transmitting the video service.

In still another possible implementation, the data transmission optimization instruction further includes handover indication information, and the handover indication information includes the identification information of the target cell to which the terminal is to be handed over; and the processing unit 202 is further configured to: before performing the data transmission optimization processing operation based on the data transmission optimization instruction, obtain load information of the target cell corresponding to the identification information, and determine that load of the target cell is greater than a preset threshold.

In still another possible implementation, the network device further includes a sending unit 203, and the processing unit 202 performs the data transmission optimization processing operation based on the data transmission optimization instruction in the following manner: sending, by using the sending unit 203, a handover request to a network device to which the target cell belongs, sending the video service context information of the terminal to the network device to which the target cell belongs, and requesting the network device to which the target cell belongs to make a data transmission optimization preparation in advance; and sending, by using the sending unit 203, a handover command to the terminal when it is determined that the network device to which the target cell belongs determines that access by the terminal is allowed, and when it is determined that the receiving unit 201 receives a handover measurement report of the terminal, where the data transmission optimization preparation includes performing access control in advance.

In still another possible implementation, the data transmission optimization processing operation further includes: enabling a coverage enhancement optimization feature for the terminal, where the coverage enhancement optimization feature includes at least one of a coordinated multipoint transmission technology or a transmission time interval bundling technology.

In still another possible implementation, the data transmission optimization instruction further includes a time interval in which optimization is to be performed, and the processing unit 202 performs the data transmission optimization processing operation based on the data transmission optimization instruction in the following manner: performing the data transmission optimization processing operation in the time interval in which optimization is to be performed.

When a hardware form is used for implementation, in this embodiment the receiving unit 201 may be a communications interface, a receiver, a transceiver, or the like, the processing unit 202 may be a processor or a controller, and the sending unit 203 may be a communications interface, a transmitter, a transceiver, or the like. The communications interface is a collective name, and may include one or more interfaces.

Figure 7:
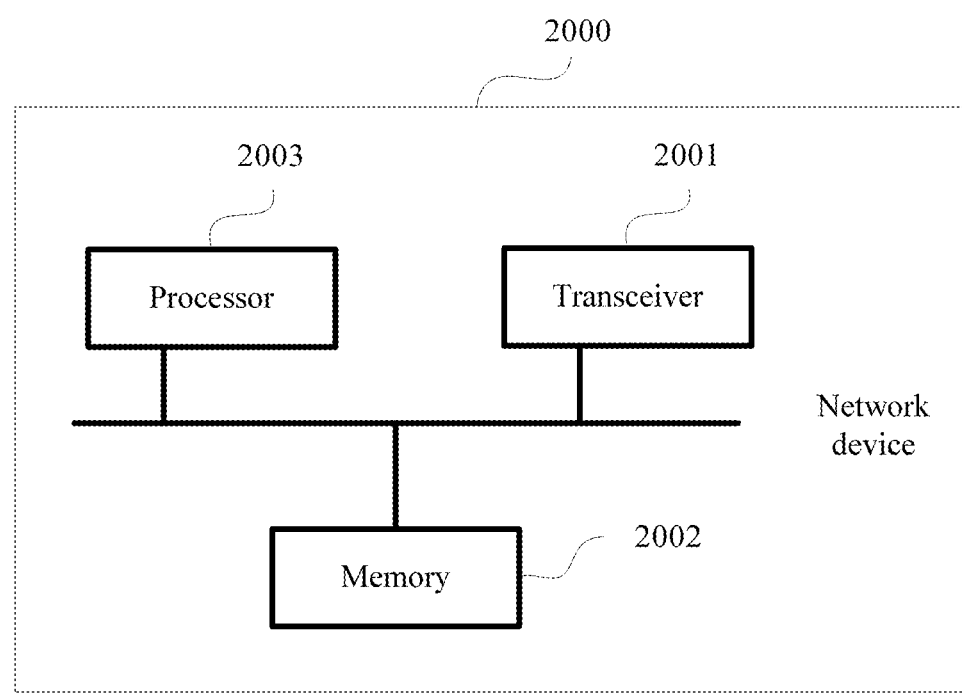
FIG. 7 is a schematic structural diagram of another network device according to an embodiment.

When the processing unit 202 is a processor, and the receiving unit 201 and the sending unit 203 are a transceiver, the network device 200 in this embodiment may be a network device shown in FIG. 7. FIG. 7 is a schematic structural diagram of a network device 2000 according to an embodiment, namely, a schematic structural diagram of another possible network device in the embodiments. Referring to FIG. 7, the network device 2000 includes a transceiver 2001, a memory 2002, and a processor 2003. The memory 2002 is configured to store an instruction, and the processor 2003 is configured to: invoke the instruction stored in the memory 2002 to perform the following function of the processor 2003, and control the transceiver 2001 to perform the following function:

the transceiver 2001 is configured to receive a data transmission optimization instruction sent by a terminal, where the data transmission optimization instruction is sent by the terminal when determining to move along a track route included in a track context and reach a to-be-optimized route segment on the track route, and is used to instruct the network device to perform a data transmission optimization processing operation, the data transmission optimization processing operation includes adjusting a resource allocation policy of the terminal, the track context is pre-generated by the terminal, and includes a track route along which the terminal moves and that is passed through by the terminal in a historical time and a to-be-optimized route segment on the track route, a value of a predefined measurement parameter meets a preset threshold value range when the terminal moves in the to-be-optimized route segment, and the measurement parameter includes at least one of signal quality, an uplink throughput rate, or a downlink throughput rate; and the processor 2003 is configured to perform the data transmission optimization processing operation based on the data transmission optimization instruction received by the transceiver 2001.

In a possible implementation, the transceiver 2001 is further configured to:

before receiving the data transmission optimization instruction sent by the terminal, send a data transmission optimization instruction parameter to the terminal, where the data transmission optimization instruction parameter includes at least one of a report indication parameter or a configuration parameter. The report indication parameter includes a parameter used to indicate that the terminal is allowed to send the data transmission optimization instruction in a cell. The configuration parameter includes a parameter used to instruct the terminal to configure the data transmission optimization instruction.

The parameter used to instruct the terminal to configure the data transmission optimization instruction includes at least one of the following parameters:

the predefined measurement parameter and the threshold value range that are utilized by the terminal for determining the to-be-optimized route segment;

a time or a location at which the terminal sends the data transmission optimization instruction, where the time or the location at which the terminal sends the data transmission optimization instruction has an association relationship with a start location of the to-be-optimized route segment; and a sending manner in which the terminal sends the data transmission optimization instruction, where the sending manner in which the terminal sends the data transmission optimization instruction includes: separately sending, by the terminal, the data transmission optimization instruction for each to-be-optimized route segment included in the track route, or when determining to move along the track route including the to-be-optimized route segment or determining to enter a first to-be-optimized route segment on the track route for moving, sending, by the terminal, data transmission optimization instructions utilized by all to-be-optimized route segments included in the track route, and a time interval between a time for sending the data transmission optimization instruction and a time for entering each to-be-optimized route segment.

In another possible implementation, if the terminal is to perform a cell handover in the to-be-optimized route segment, the track context further includes identification information of a target cell to which the terminal is to be handed over.

In still another possible implementation, the data transmission optimization instruction includes a video service indication indicating that the terminal performs a video service; and the processor 2003 performs the data transmission optimization processing operation based on the data transmission optimization instruction in the following manner: increasing a resource allocation of the terminal, and if the resource allocation of the terminal cannot be increased due to a resource limitation, sending, to the terminal, instruction information used to instruct to reduce a bit rate of the video service.

In still another possible implementation, the data transmission optimization instruction further includes video service context information, and the video service context information includes cache information and bit rate information of the video service. The processor 2003 is further configured to determine, based on the cache information and the bit rate information before increasing the resource allocation of the terminal, that a volume of data transmitted by the terminal by using an existing resource within a preset duration is less than a data volume utilized for transmitting the video service.

In still another possible implementation, the data transmission optimization instruction further includes handover indication information, and the handover indication information includes the identification information of the target cell to which the terminal is to be handed over; and the processor 2003 is further configured to: before performing the data transmission optimization processing operation based on the data transmission optimization instruction, obtain load information of the target cell corresponding to the identification information, and determine that load of the target cell is greater than a preset threshold.

In still another possible implementation, the processor 2003 performs the data transmission optimization processing operation based on the data transmission optimization instruction in the following manner: sending, by using the transceiver 2001, a handover request to a network device to which the target cell belongs, sending the video service context information of the terminal to the network device to which the target cell belongs, and requesting the network device to which the target cell belongs to make a data transmission optimization preparation in advance; and sending, by using the transceiver 2001, a handover command to the terminal when it is determined that the network device to which the target cell belongs determines that access by the terminal is allowed, and when it is determined that the transceiver 2001 receives a handover measurement report of the terminal, where the data transmission optimization preparation includes performing access control in advance.

In still another possible implementation, the data transmission optimization processing operation further includes: enabling a coverage enhancement optimization feature for the terminal, where the coverage enhancement optimization feature includes at least one of a coordinated multipoint transmission technology or a transmission time interval bundling technology.

In still another possible implementation, the data transmission optimization instruction further includes a time interval in which optimization is to be performed, and the processor 2003 performs the data transmission optimization processing operation based on the data transmission optimization instruction in the following manner: performing the data transmission optimization processing operation in the time interval in which optimization is to be performed.

In the embodiments described herein, for concepts, explanations, detailed descriptions, and other steps of the terminal and the network device that are related to the technical solutions provided in the embodiments, refer to the descriptions about such content in the foregoing methods or other embodiments. Details are not described herein again for the sake of brevity.

It may be understood that, in the accompanying drawings of the embodiments, only simplified designs of the network device and the terminal are shown. In actual application, the network device and the terminal are not limited to the foregoing structures. For example, the terminal may further include a display device, an input/output interface, and the like, and all terminals that can implement the embodiments are within the protection scope of the embodiments. The network device may further include any quantity of transmitters, receivers, processors, controllers, memories, communications units, or the like, and all network devices that can implement the embodiments are within the protection scope of the embodiments.

It should be noted that the foregoing processor in the embodiments may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor, and or the like.

The memory may be integrated in the processor, or may be separated from the processor.

In an implementation, it may be considered that the functions of the receiver and the transmitter may be implemented by using a transceiver circuit or a dedicated transceiver chip. It may be considered that, the processor may be implemented by using a dedicated processing chip, a processing circuit, a processor, or a universal chip.

In another implementation, program code that is used to implement the functions of the processor, the receiver, and the transmitter is stored in the memory. A general-purpose processor implements the functions of the processor, the receiver, and the transmitter by executing the code in the memory.

According to the method provided in the embodiments, an embodiment further provides a communications system, which includes the foregoing network device and one or more terminals.

An embodiment further provides a computer storage medium, configured to store some instructions. When the instructions are executed, any data transmission optimization method previously described may be performed.

A person or ordinary skill in the art should understand that an embodiment may be provided as a method, a system, or a computer program product. Therefore, the embodiments may use a form of hardware only embodiments, software only embodiments, or embodiments with a combination of software and hardware. Moreover, the embodiments may use a form of a computer program product that is implemented on one or more computer-usable storage media (including but not limited to a magnetic disk memory, a CD-ROM, an optical memory, and the like) that include computer-usable program code.

The embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

What is claimed is:

1. A data transmission optimization method, comprising:
   determining, by a terminal, to move along a track route comprised in a track context and reach a to-be-optimized route segment on the track route, wherein the track context is pre-generated by the terminal, wherein the track context comprises: the track route along which the terminal moves and which the terminal passes through in a historical time; and the to-be-optimized route segment on the track route, wherein a value of a predefined measurement parameter meets a preset threshold value range when the terminal moves in the to-be-optimized route segment, and wherein the measurement parameter comprises at least one of signal quality, an uplink throughput rate, or a downlink throughput rate; and sending, by the terminal, a data transmission optimization instruction to at least one network device, wherein the data transmission optimization instruction is used to instruct the at least one network device to perform a data transmission optimization processing operation, and the data transmission optimization processing operation comprises adjusting a resource allocation policy of the terminal;

wherein the data transmission optimization instruction comprises a high-rate service identification parameter associated with a high-rate service; and wherein the data transmission optimization processing operation comprises: based on receipt of the high-rate service identification parameter, determining if a resource allocation of the terminal can be increased and if a resource limitation exists, increasing the resource allocation of the terminal when the resource allocation of the terminal can be increased, and if the resource allocation of the terminal cannot be increased due to the resource limitation, sending, to the terminal, instruction information used to instruct the terminal to reduce a bit rate of the high-rate service;

wherein the high-rate service is a video service;

the data transmission optimization instruction further comprises video service context information, and the video service context information comprises: cache information comprising at least a volume of a video cache of the video service; and bit rate information of the video service; and the data transmission optimization instruction is further used for instructing the at least one network device to determine, based on the cache information and the bit rate information before increasing the resource allocation of the terminal, that a volume of data transmitted by the terminal by using an existing resource within a preset duration is less than a data volume required for transmitting the video service, and the data volume required for transmitting the video service is obtained by subtracting data volume of the video cache from a data volume corresponding to the bit rate information included in the video service context information within the preset duration.

2. The method according to claim 1, wherein before the sending, by the terminal, of the data transmission optimization instruction to the at least one network device, the method further comprises:

receiving, by the terminal, a data transmission optimization instruction parameter sent by the at least one network device, wherein the data transmission optimization instruction parameter comprises at least one of a report indication parameter or a configuration parameter, wherein the report indication parameter comprises a parameter used to indicate that the terminal is allowed to send the data transmission optimization instruction in a cell;

the configuration parameter comprises another parameter used to instruct the terminal to configure the data transmission optimization instruction, and the another parameter used to instruct the terminal to configure the data transmission optimization instruction comprises at least one of the following parameters:

the predefined measurement parameter and the threshold value range that are required by the terminal for determining the to-be-optimized route segment;

a time or a location at which the terminal sends the data transmission optimization instruction, wherein the time or the location at which the terminal sends the data transmission optimization instruction has an association relationship with a start location of the to-be-optimized route segment; and a sending manner in which the terminal sends the data transmission optimization instruction, wherein the sending manner in which the terminal sends the data transmission optimization instruction comprises one of:

separately sending, by the terminal, the data transmission optimization instruction for each to-be-optimized route segment comprised in the track route; or when determining to move along the track route comprising the to-be-optimized route segment or determining to enter a first to-be-optimized route segment on the track route for moving, sending, by the terminal, data transmission optimization instructions required by all to-be-optimized route segments comprised in the track route, and a time interval between a time for sending the data transmission optimization instruction and a time for entering each to-be-optimized route segment.

3. The method according to claim 1, wherein the track context further comprises identification information of a target cell to which the terminal is to be handed over, and the method further comprises:

performing a cell handover based on the identification information of the target cell, if the terminal is to perform the cell handover in the to-be-optimized route segment.

4. The method according to claim 1, wherein the data transmission optimization instruction further comprises handover indication information, and the handover indication information comprises the identification information of a target cell to which the terminal is to be handed over; and the data transmission optimization instruction is further used for instructing the at least one network device to, before performing the data transmission optimization processing operation, obtain load information of the target cell corresponding to the identification information and determine that load of the target cell is greater than a preset threshold.

5. The method according to claim 4, wherein the data transmission optimization instruction is further used for: instructing a first network device to which a serving cell in which the terminal is currently located belongs to send a handover request to a second network device to which the target cell belongs, sending video service context information of the terminal to the second network device to which the target cell belongs, and requesting the second network device to which the target cell belongs to make a data transmission optimization preparation in advance; and instructing the first network device to which the serving cell belongs to send a handover command to the terminal when it is determined that the second network device to which the target cell belongs determines that access by the terminal is allowed and when it is determined that a handover measurement report of the terminal is received; and the data transmission optimization preparation comprises performing access control in advance.

6. The method according to claim 1, wherein the data transmission optimization processing operation comprises: enabling a coverage enhancement optimization feature for the terminal, wherein the coverage enhancement optimization feature comprises at least one of a coordinated multipoint transmission technology or a transmission time interval bundling technology.

7. The method according to claim 1, wherein the data transmission optimization instruction further comprises a time interval in which optimization is to be performed, and is used to instruct the at least one network device to perform the data transmission optimization processing operation in the time interval in which optimization is to be performed.

8. A terminal, comprising: a processor, a memory, and a transmitter, wherein the memory is configured to store an instruction, and the processor is configured to: invoke the instruction stored in the memory to perform the following function of the processor, and control the transmitter to perform the following function:

the processor is configured to determine that the terminal is to move along a track route comprised in a track context and reach a to-be-optimized route segment on the track route, wherein the track context is pre-generated by the terminal, wherein the track context comprises: the track route along which the terminal moves and which the terminal passes through in a historical time; and the to-be-optimized route segment on the track route, wherein a value of a predefined measurement parameter meets a preset threshold value range when the terminal moves in the to-be-optimized route segment, and wherein the measurement parameter comprises at least one of signal quality, an uplink throughput rate, or a downlink throughput rate; and the transmitter is configured to send a data transmission optimization instruction to at least one network device when the processor determines that the terminal is to move along the track route comprised in the track context and reach the to-be-optimized route segment on the track route, wherein the data transmission optimization instruction is used to instruct the at least one network device to perform a data transmission optimization processing operation, and the data transmission optimization processing operation comprises adjusting a resource allocation policy of the terminal;

wherein the data transmission optimization instruction comprises a high-rate service identification parameter associated with a high-rate service; and wherein the data transmission optimization processing operation comprises: based on receipt of the high-rate service identification parameter, determining if a resource allocation of the terminal can be increased and if a resource limitation exists, increasing the resource allocation of the terminal when the resource allocation of the terminal can be increased, and if the resource allocation of the terminal cannot be increased due to the resource limitation, sending, to the terminal, instruction information used to instruct the terminal to reduce a bit rate of the high-rate service;

wherein the high-rate service is a video service;

the data transmission optimization instruction further comprises video service context information, and the video service context information comprises: cache information comprising at least a volume of a video cache of the video service; and bit rate information of the video service; and the data transmission optimization instruction is further used for instructing the at least one network device to determine, based on the cache information and the bit rate information before increasing the resource allocation of the terminal, that a volume of data transmitted by the terminal by using an existing resource within a preset duration is less than a data volume required for transmitting the video service, and the data volume required for transmitting the video service is obtained by subtracting data volume of the video cache from a data volume corresponding to the bit rate information included in the video service context information within the preset duration.

9. The terminal according to claim 8, wherein the terminal further comprises a receiver, and the processor is further configured to control the receiver to perform the following function:

before the transmitter sends the data transmission optimization instruction to the at least one network device, receive a data transmission optimization instruction parameter sent by the at least one network device, wherein the data transmission optimization instruction parameter comprises at least one of a report indication parameter or a configuration parameter, wherein the report indication parameter comprises a parameter used to indicate that the terminal is allowed to send the data transmission optimization instruction in a cell;

the configuration parameter comprises another parameter used to instruct the terminal to configure the data transmission optimization instruction, and the another parameter used to instruct the terminal to configure the data transmission optimization instruction comprises at least one of the following parameters:

the predefined measurement parameter and the threshold value range that are required by the terminal for determining the to-be-optimized route segment;

a time or a location at which the terminal sends the data transmission optimization instruction, wherein the time or the location at which the terminal sends the data transmission optimization instruction has an association relationship with a start location of the to-be-optimized route segment; and a sending manner in which the terminal sends the data transmission optimization instruction, wherein the sending manner in which the terminal sends the data transmission optimization instruction comprises one of:

separately send, by the terminal, the data transmission optimization instruction for each to-be-optimized route segment comprised in the track route; or when determining to move along the track route comprising the to-be-optimized route segment or determining to enter a first to-be-optimized route segment on the track route for moving, send, by the terminal, data transmission optimization instructions required by all to-be-optimized route segments comprised in the track route, and a time interval between a time for sending the data transmission optimization instruction and a time for entering each to-be-optimized route segment.

10. The terminal according to claim 9, wherein the track context further comprises identification information of a target cell to which the terminal is to be handed over, and the processor is further configured to:

perform a cell handover based on the identification information of the target cell, if the terminal is to perform the cell handover in the to-be-optimized route segment.

11. The terminal according to claim 9, wherein the data transmission optimization instruction further comprises handover indication information, and the handover indication information comprises the identification information of a target cell to which the terminal is to be handed over; and the data transmission optimization instruction is further used to instruct the at least one network device to, before performing the data transmission optimization processing operation, obtain load information of the target cell corresponding to the identification information and determine that load of the target cell is greater than a preset threshold.

12. The terminal according to claim 11, wherein the data transmission optimization instruction is further used to: instruct a first network device to which a serving cell in which the terminal is currently located belongs to send a handover request to a second network device to which the target cell belongs, send video service context information of the terminal to the second network device to which the target cell belongs, and request the second network device to which the target cell belongs to make a data transmission optimization preparation in advance; and instruct the first network device to which the serving cell belongs to send a handover command to the terminal when it is determined that the second network device to which the target cell belongs determines that access by the terminal is allowed, and when it is determined that a handover measurement report of the terminal is received; and the data transmission optimization preparation comprises performing access control in advance.

13. The terminal according to claim 9, wherein the data transmission optimization processing operation comprises: enabling a coverage enhancement optimization feature for the terminal, wherein the coverage enhancement optimization feature comprises at least one of a coordinated multi-point transmission technology or a transmission time interval bundling technology.

14. The terminal according to claim 9, wherein the data transmission optimization instruction further comprises a time interval in which optimization is to be performed, and is used to instruct the at least one network device to perform the data transmission optimization processing operation in the time interval in which optimization is to be performed.

15. A non-transitory computer-readable storage medium, comprising a program, wherein when being executed by a processor, the following steps are performed:

determining, to move along a track route comprised in a track context and reach a to-be-optimized route segment on the track route, wherein the track context is pre-generated by the terminal, wherein the track context comprises: the track route along which the terminal moves and which the terminal passes through in a historical time; and the to-be-optimized route segment on the track route, wherein a value of a predefined measurement parameter meets a preset threshold value range when the terminal moves in the to-be-optimized route segment, and wherein the measurement parameter comprises at least one of signal quality, an uplink throughput rate, or a downlink throughput rate; and sending a data transmission optimization instruction to at least one network device, wherein the data transmission optimization instruction is used to instruct the network device to perform a data transmission optimization processing operation, and the at least one data transmission optimization processing operation comprises adjusting a resource allocation policy of the terminal;

wherein the data transmission optimization instruction comprises a high-rate service identification parameter associated with a high-rate service; and wherein the data transmission optimization processing operation comprises: based on receipt of the high-rate service identification parameter, determining if a resource allocation of the terminal can be increased and if a resource limitation exists, increasing the resource allocation of the terminal when the resource allocation of the terminal can be increased, and if the resource allocation of the terminal cannot be increased due to the resource limitation, sending, to the terminal, instruction information used to instruct the terminal to reduce a bit rate of the high-rate service;

wherein the high-rate service is a video service;

the data transmission optimization instruction further comprises video service context information, and the video service context information comprises: cache information comprising at least a volume of a video cache of the video service; and bit rate information of the video service; and the data transmission optimization instruction is further used for instructing the at least one network device to determine, based on the cache information and the bit rate information before increasing the resource allocation of the terminal, that a volume of data transmitted by the terminal by using an existing resource within a preset duration is less than a data volume required for transmitting the video service, and the data volume required for transmitting the video service is obtained by subtracting data volume of the video cache from a data volume corresponding to the bit rate information included in the video service context information within the preset duration.

* * * * *